(12) United States Patent
Li et al.

(10) Patent No.: US 9,373,914 B2
(45) Date of Patent: Jun. 21, 2016

(54) LINKAGE APPARATUS FOR PLUGGING PCB BOARD

(71) Applicant: Huawei Technologies Co., Ltd., Shenzhen (CN)

(72) Inventors: Shuang Li, Hangzhou (CN); Jun Zhao, Munich (DE); Chengpeng Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 14/472,744

(22) Filed: Aug. 29, 2014

(65) Prior Publication Data

US 2015/0017828 A1  Jan. 15, 2015

Related U.S. Application Data

(63) Continuation of application No. PCT/CN2013/077253, filed on Jun. 14, 2013.

(30) Foreign Application Priority Data

Jun. 27, 2012  (CN) .......................... 2012 1 0214481

(51) Int. Cl.
*H05K 5/00* (2006.01)
*H01R 13/629* (2006.01)
*G06F 1/18* (2006.01)

(52) U.S. Cl.
CPC .......... *H01R 13/62988* (2013.01); *G06F 1/185* (2013.01); *G06F 1/186* (2013.01); *H01R 13/629* (2013.01)

(58) Field of Classification Search
USPC ............ 361/727, 756, 747, 759, 755; 439/64, 439/159, 160, 377, 641
See application file for complete search history.

(56) References Cited

U.S. PATENT DOCUMENTS 5,657,204 A 8/1997 Hunt
5,815,377 A 9/1998 Lund et al.
(Continued)

FOREIGN PATENT DOCUMENTS

CN 2901619 Y 5/2007
CN 101873781 A 10/2010
(Continued)

OTHER PUBLICATIONS

Partial English Translation and Abstract of Chinese Patent Application No. CN102761022A, Sep. 2, 2014, 3 pages.
(Continued)

*Primary Examiner* — Hung S Bui
(74) *Attorney, Agent, or Firm* — Conley Rose, P.C.; Grant Rodolph; Nicholas K. Beaulieu

(57) ABSTRACT

A linkage apparatus is provided. The linkage apparatus is disposed between a bottom plate and a carrier plate, and the linkage apparatus includes a drag link and an "L" shape swing link. The drag link is rotatably connected to an end of the "L" shape swing link, and the drag link and the bottom plate are connected to a fixing pin by using a horizontal guide groove; a corner in the middle of the swing link is rotatably connected to the bottom plate, and another end is fastened to the carrier plate; another fixing pin connects the bottom plate and the carrier plate. The swing link is driven by the drag link, so that the carrier plate can be driven to vertically move. Therefore, hot plugging of a peripheral component interconnect (PCI) express card fastened on the carrier plate and plugging of another printed circuit board (PCB) that requires two-dimensional plugging can be implemented without interrupting a power supply.

16 Claims, 8 Drawing Sheets

(56) References Cited

U.S. PATENT DOCUMENTS

| | | | |
|---|---|---|---|
| 6,071,143 | A | 6/2000 | Barthel et al. |
| 6,162,073 | A | 12/2000 | Haq et al. |
| 6,288,911 | B1 | 9/2001 | Aoki et al. |
| 6,406,322 | B1 | 6/2002 | Barringer et al. |
| 6,411,517 | B1 | 6/2002 | Babin |
| 6,667,890 | B1 | 12/2003 | Barringer et al. |
| 6,674,651 | B2 | 1/2004 | Momiyama et al. |
| 6,698,937 | B2 | 3/2004 | Grimes et al. |
| 6,930,892 | B2 | 8/2005 | Barringer et al. |
| 7,145,780 | B2 | 12/2006 | Malone et al. |
| 7,215,556 | B2 | 5/2007 | Wrycraft |
| 7,255,570 | B1 | 8/2007 | Feldman et al. |
| 7,265,968 | B2 | 9/2007 | Champion et al. |
| 7,283,371 | B1 | 10/2007 | Grouell et al. |
| 7,297,015 | B1 | 11/2007 | Desrosiers et al. |
| 7,420,816 | B2 | 9/2008 | Rubenstein |
| 7,435,114 | B2 | 10/2008 | Desrosiers et al. |
| 7,663,889 | B2 * | 2/2010 | Lajara .................... G06F 1/185 361/748 |
| 2005/0115342 | A1 * | 6/2005 | Barringer ................ F16H 25/24 74/89.23 |
| 2012/0240704 | A1 | 9/2012 | Li et al. |

FOREIGN PATENT DOCUMENTS

| | | |
|---|---|---|
| CN | 201845266 U | 5/2011 |
| CN | 202262183 U | 5/2012 |
| CN | 102738685 A | 10/2012 |
| CN | 102761022 A | 10/2012 |
| EP | 2217048 A2 | 8/2010 |
| JP | 2006210632 A | 8/2006 |

OTHER PUBLICATIONS

Partial English Translation and Abstract of Chinese Patent Application No. CN201845266, May 11, 2014, 10 pages.

Partial English Translation and Abstract of Chinese Patent Application No. CN102738685A, Oct. 11, 2014, 23 pages.

Foreign Communication From a Counterpart Application, Chinese Application No. 201210214481.7, Chinese Search Report dated Jan. 21, 2014, 2 pages.

Foreign Communication From a Counterpart Application, Chinese Application No. 201210214481.7, Chinese Office Action dated Jan. 28, 2014, 6 pages.

Foreign Communication From a Counterpart Application, PCT Application No. PCT/CN2013/077253, English Translation of International Search Report dated Sep. 19, 2013, 2 pages.

Foreign Communication From a Counterpart Application, PCT Application No. PCT/CN2013/077253, Written Opinion dated Sep. 19, 2013, 4 pages.

* cited by examiner

LINKAGE APPARATUS FOR PLUGGING PCB BOARD

CROSS-REFERENCE TO RELATED APPLICATIONS

This application is a continuation of International Application No. PCT/CN2013/077253, filed on Jun. 14, 2013, which claims priority to Chinese Patent Application No. 201210214481.7, filed on Jun. 27, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to a linkage apparatus, and in particular, to a linkage apparatus for plugging a printed circuit board (PCB).

BACKGROUND

A peripheral component interconnect (PCI) express card is a bus interface board for interconnecting peripheral devices of a computer or a communications platform, and is commonly applied to a product such as a server. An interface of a PCI express varies with a bit width of a bus, including X1, X4, X8, and X16. A shorter PCI express card can be inserted into a longer PCI express slot for use.

The PCI express card has series standards, including appearance and dimensions, and can be directly purchased for use. Among products such as a server, a requirement for hot plugging of a PCI express card is usually imposed to improve system maintainability and meet a requirement for assembling and the like. Moreover, a circuit thereof can also support hot plugging. However, in the prior art, a connector of a PCI express card is located on an adjacent side of a plane on which a panel is located rather than an opposite side of a conventional board. Due to its special form, the PCI express card cannot be directly plugged into or unplugged from the panel, but needs to be unplugged from a top part after a chassis is taken out and a chassis cover is open. Therefore, it is hard to meet a requirement for hot plugging of the PCI express card without interrupting a power supply of a device and without interrupting a service.

Furthermore, in addition to a PCI express card, a scenario in which another PCB requires two-dimensional plugging also exists. In the prior art, a mechanism for implementing two-dimensional plugging is not convenient and reliable enough.

SUMMARY

An objective of embodiments of the present disclosure is to provide a linkage apparatus that can meet a requirement for hot plugging without interrupting a power supply and a service and implement two-dimensional plugging of a PCB including a PCI express card.

To solve a technical problem in the prior art that a PCI express card cannot be simply and conveniently hot plugged, the embodiments of the present disclosure provide a linkage apparatus for plugging a PCB. The linkage apparatus is disposed between a bottom plate and a carrier plate, where the carrier plate is configured to fasten the PCB, and the bottom plate, the carrier plate, and the PCB are parallel to one another; the linkage apparatus includes a drag link and a swing link, where the drag link is rotatably connected to the swing link, the drag link and the bottom plate are connected to a first fixing pin by using a horizontal guide groove, the first fixing pin can move in the horizontal guide groove, an outward-extending end of the drag link forms a handle, and the handle can push and pull the drag link to move to the outside; and the swing link is in an "L" shape, where a first end is rotatably connected to the drag link, a corner in the middle is rotatably connected to the bottom plate, and a second end is fastened to the carrier plate; and a third fixing pin connects the bottom plate and the carrier plate, a vertical guide groove is provided on the carrier plate, and the third fixing pin can move in the vertical guide groove.

The linkage apparatus further includes a locking mechanism for preventing the carrier plate from freely sliding off during plugging.

The locking mechanism is disposed below the drag link and includes a locking rod and an elastic apparatus configured to reset the locking rod; the locking rod includes a first side, a second side, and a third side that are connected in a top-down sequence, where one end of the first side is free and forms a hook end in a hook shape, the other end of the first side is connected to a first end of the second side and is hinged to the bottom plate at a joint, a second end of the second side is connected to one end of the third side, the other end of the third side is a free end, and both the first side and the second side, and the second side and the third side are connected by forming a certain angle; and a boss is downward projected from the drag link, an inner end of the boss is snap-fitted with the hook end of the locking rod at a pull-out position of the drag link, and the free end of the locking rod is in contact with stowage and is stressed when the stowage is loaded on the bottom plate and the carrier plate.

One end of the elastic apparatus is fastened to the hook end of the locking rod, and the other end of the elastic apparatus is fastened to the bottom plate.

The other end of the elastic apparatus passes through a convex hull provided on the bottom plate and is fastened.

The elastic apparatus is an elastic sheet or a clamping spring.

The two horizontal guide grooves between which a certain interval exists are opened on the drag link, and a corresponding first fixing pin that can move in the horizontal guide groove is disposed in each of the horizontal guide grooves.

There are two or more than two third fixing pins, including the first fixing pin that connects the drag link and the bottom plate; and each of the third fixing pins is disposed in a corresponding different vertical guide groove.

The PCB is a PCI express card.

The horizontal guide groove is opened on the bottom plate and the first fixing pin is disposed on the drag link.

The horizontal guide groove is opened on the drag link and the first fixing pin is disposed on the bottom plate.

A fixing hole is provided on the carrier plate, a second fixing pin is disposed on the second end of the swing link, and the second fixing pin passes through the fixing hole to fasten the swing link and the carrier plate.

A fixing hole is provided on the second end of the swing link, a second fixing pin is disposed on the carrier plate, and the second fixing pin passes through the fixing hole to fasten the swing link and the carrier plate.

There are multiple swing links, and the swing links are located on the same side or two sides of the horizontal guide groove.

Accordingly, an embodiment of the present disclosure further provides a finished board, including a bottom plate, a carrier plate, a PCB fastened on the carrier plate, and the foregoing linkage apparatus for plugging a PCB.

Accordingly, an embodiment of the present disclosure further provides a subrack for plug-connecting a finished board, including a guide rail, where the finished board is the foregoing finished board, and the guide rail matches a bottom of the finished board and is configured to install or remove the finished board in a sliding manner.

According to the linkage apparatus for plugging a PCB, the finished board, and the subrack provided in the embodiments of the present disclosure, a swing link is driven by a drag link, so that a carrier plate can be driven to vertically move. In this way, hot plugging of a PCI express card fastened on the carrier plate and plugging of another PCB that requires two-dimensional plugging can be implemented by pushing and pulling the drag link without interrupting a power supply. The linkage apparatus used in the embodiments of the present disclosure has a simple structure, is reliable, and has good operability.

BRIEF DESCRIPTION OF THE DRAWINGS

To illustrate the technical solutions of the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the implementation manners of the present disclosure with reference to the accompanying drawings in the implementation manners of the present disclosure.

Referring to FIG. 1 to FIG. 5 together, a first implementation manner of the present disclosure provides a linkage apparatus for plugging a PCB.

Figure 1:
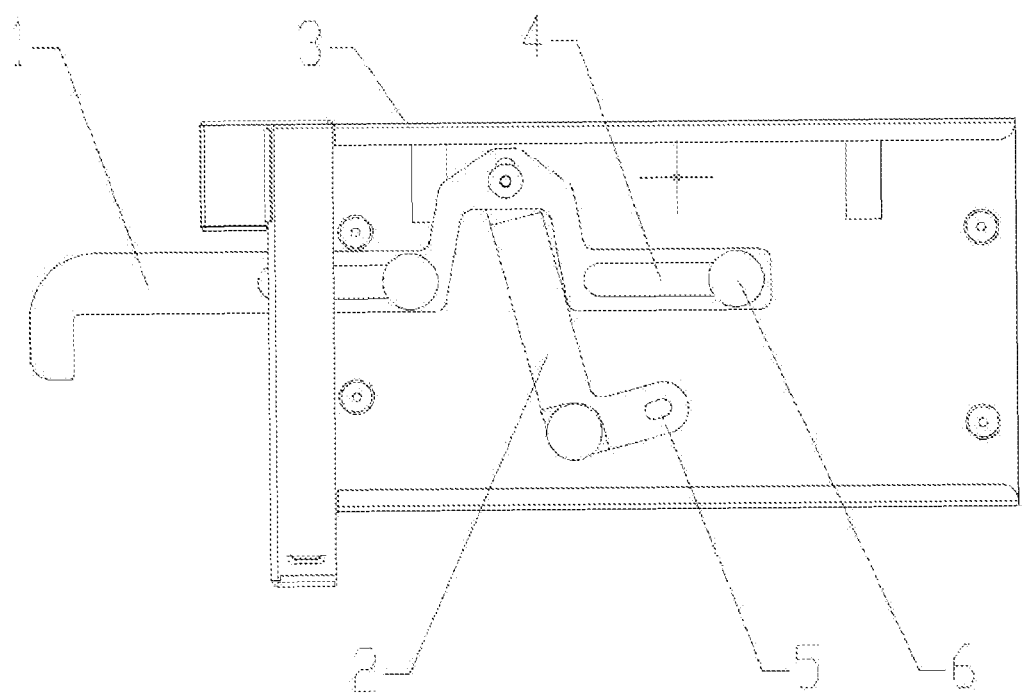
FIG. 1 is a schematic diagram of a pull-out state of a drag link according to a first implementation manner of the present disclosure.
Figure 4:
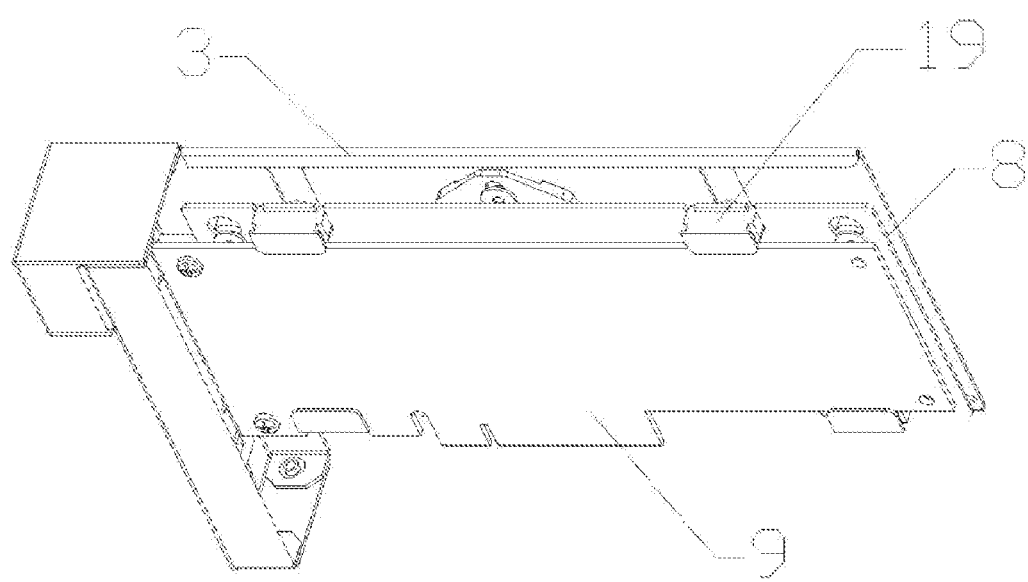
FIG. 4 is a schematic diagram of an assembled finished board shown in FIG. 3.

As shown in FIG. 1, a linkage apparatus for plugging a PCB is disclosed. The linkage apparatus includes a drag link 1 and a swing link 2. As shown in FIG. 4, the linkage apparatus is disposed between a bottom plate 3 and a carrier plate 8. The carrier plate 8 is configured to fasten a PCB 9. The bottom plate 3, the carrier plate 8, and the PCB 9 are parallel to one another. It should be noted that, because a thickness of the bottom plate 3, the carrier plate 8, and the PCB 9 is a small number relative to their respective length and width, the plates and the board in the foregoing may be approximately considered as planes. Therefore, that the bottom plate 3, the carrier plate 8, and the PCB 9 are parallel to one another actually indicates that side faces thereof are parallel to one another. Specifically, as shown in FIG. 4, a PCB clamping groove 19 configured to fasten the PCB is installed on the carrier plate 8. A position of the PCB is limited by four clamping grooves. When the carrier plate 8 is driven by the drag link 1 to move upward and downward, that is, the PCB is driven to move upward and downward, plugging of the PCB is implemented.

Figure 2:
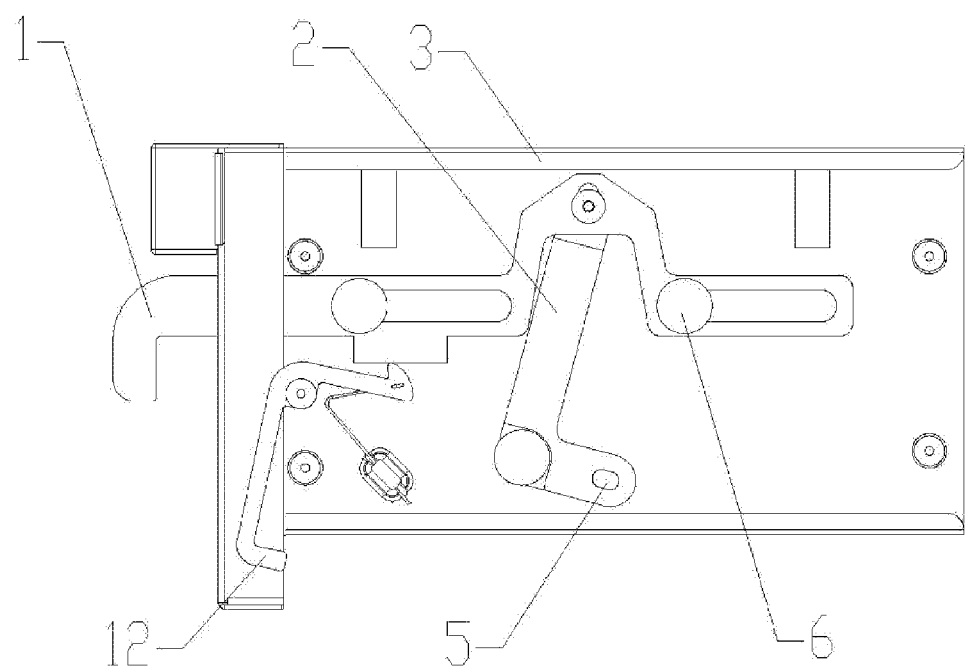
FIG. 2 is a schematic diagram of a push-in state of the drag link shown in FIG. 1.

As shown in FIG. 1 and FIG. 2, the drag link 1 is hinged to the swing link 2. A horizontal guide groove 4 is opened on the drag link 1. A first fixing pin 6 is disposed on the bottom plate 3. The first fixing pin 6 connects the drag link 1 and the bottom plate 3. The first fixing pin 6 can move in the horizontal guide groove 4. FIG. 1 shows horizontal movement inward or outward, where inward and outward are defined based on an inward or an outward direction of a chassis of the PCB when the PCB is in a use state. An outward-extending end of the drag link forms a handle, and the handle can push and pull the drag link to move inward or outward. It should be noted that, the handle refers to an area or a position that can be manually or mechanically applied with thrust or tension, includes various common shapes and structures, and may be in a linear shape, a hook shape, or the like, which is not further described herein. The swing link 2 is in an "L" shape, a first end is hinged to the drag link 1, a corner in the middle is hinged to the bottom plate 3, and a fixing hole 5 is provided on a second end. It should be noted that, the "L" shape of the swing link 2 can change upward and downward and left and right orientations according to an actual use situation, to change to a "7" shape, a "[" shape, or a "]" shape, which all fall within the scope of the "L" shape.

It should be noted that, as well-known by a person skilled in the art, hinge refers to a flexible connection and is classified into imaginary hinge, real hinge, single hinge, complex hinge, and the like, and is a connection manner for implementing relative rotation of two connected objects. Hinge can be implemented not only by using a common hinge. For example, the hinge is implemented by using a combination of a fixing pin and a hole or another common manner, which is not further described herein. Furthermore, in addition to the hinge, the linkage apparatus provided in the embodiments of the present disclosure may further use another rotating connection manner. The hinge is only an example, and the embodiments of the present disclosure are not limited thereto.

Figure 3:
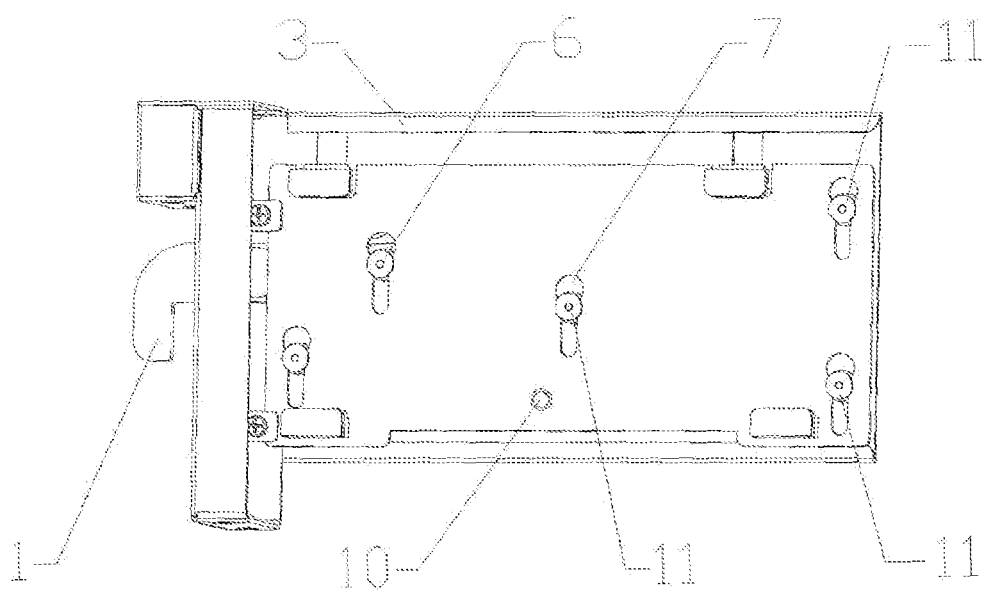
FIG. 3 is a schematic diagram of assembling of a carrier plate, a linkage apparatus, and a bottom plate according to the first implementation manner of the present disclosure.

As shown in FIG. 3, a second fixing pin 10 is disposed on the carrier plate 8, and the second fixing pin 10 passes through the fixing hole 5 to fasten the swing link 2 and the carrier plate 8. A third fixing pin 11 that connects the bottom plate 3 and the carrier plate 8 is disposed on the bottom plate 3, a vertical guide groove 7 is provided on the carrier plate 8, and the third fixing pin 11 can move in the vertical guide groove 7.

Preferably, as shown in FIG. 1 and FIG. 2, the two horizontal guide grooves 4 between which a certain interval exists are opened on the drag link 1, and a corresponding first fixing pin 6 that can move in the horizontal guide groove is disposed in each of the horizontal guide grooves. Moreover, a hinging position of the drag link 1 and the swing link 2 is higher than a position of the horizontal guide groove 4.

Preferably, as shown in FIG. 3, there are multiple third fixing pins 11, including the first fixing pin 6 that fastens the drag link 1 and the bottom plate 3. That is, each of the third fixing pins 11 fastens the bottom plate 3 and the carrier plate 8. In this preferred case, the first fixing pin that connects the bottom plate 3 and the drag link 1 is permanently connected to the carrier plate 8, so as to implement a function of fastening the bottom plate 3 and the carrier plate 8 in addition to a function of connecting the bottom plate 3 and the drag link 1. In this case, a scope of the third fixing pin 11 includes the first fixing pin 6. Each of the third fixing pins 11 is disposed in a corresponding different vertical guide groove 7.

In a process of plugging and unplugging a finished board, the carrier plate 8 on which the PCB 9 is installed needs to be in an above position in a vertical direction to prevent a collision between a PCB connector and a backplane. Therefore, as shown in FIG. 2, the linkage apparatus further includes a locking mechanism 12 for preventing the carrier plate 8 from freely sliding off during plugging. The locking mechanism 12 is disposed below the drag link 1 and is close to an outside of the drag link 1. The below and outside limited herein are all defined according to a direction of the PCB in a common use state.

Figure 5:
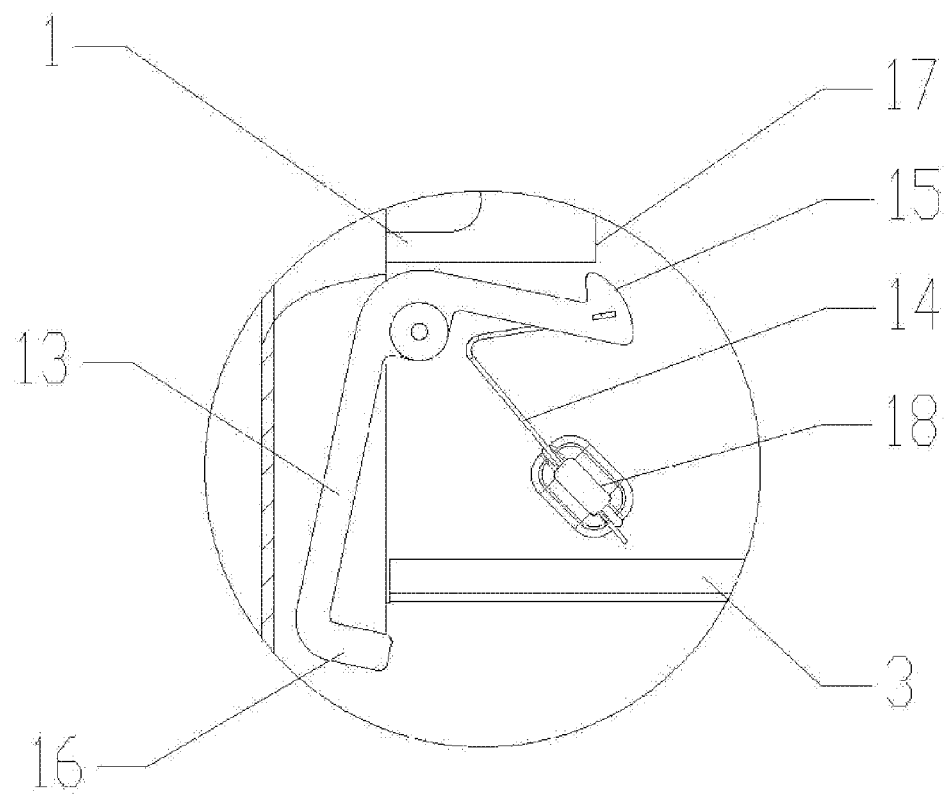
FIG. 5 is an enlarged schematic diagram of a locking mechanism shown in FIG. 2.

As shown in FIG. 5, the locking mechanism 12 includes a locking rod 13 and an elastic apparatus 14 configured to reset the locking rod 13; the locking rod 13 includes a first side, a second side, and a third side that are connected in a top-down sequence, where one end of the first side is free and forms a hook end 15 in a hook shape, the other end of the first side is connected to a first end of the second side and is hinged to the bottom plate 3 at a joint, which can be implemented by using a hinge, a second end of the second side is connected to one end of the third side, the other end of the third side is a free end 16, and both the first side and the second side, and the second side and the third side are connected by forming a certain angle. A person skilled in the art should understand that, forming a certain angle is to implement a rotation function of the locking rod 13, snap-fitting of the hook end 15, and an action between the free end 16 and stowage require an angle in a certain range. The angle is determined according to an actual situation, including a specific installation position and a size of the locking mechanism, and the like. Therefore, a specific numerical value and a range of the angle are unnecessary to be limited, and a range defined by the certain angle is still explicit.

A boss is downward projected from the drag link 1, an inner end 17 of the boss is snap-fitted with the hook end 15 of the locking rod 13 at a pull-out position of the drag link 1, and the free end 16 of the locking rod is in contact with stowage and is stressed when the stowage is loaded on the bottom plate 3 and the carrier plate 8.

When the bottom plate 3, the carrier plate 8, and the PCB 9 that are fastened together are in a pull-out position, the hook end 15 of the locking rod 13 is hooked on the inner end 17 of the boss of the drag link 1. In this case, the drag link 1 cannot horizontally move. When the bottom plate 3 and the carrier plate 8 are being pushed in, the free end 15 of the locking rod 13 is in contact with an undersurface of the stowage and is stressed. Then, the locking rod 13 rotates around a hinge joint to enable the hook end 15 to be gradually detached from the inner end 17 of the boss of the drag link 1. After the push-in operation is completed, the hook end 15 is completely detached from the inner end 17 of the boss. In this case, the drag link 1 is pushed and the drag link 1 horizontally moves. Being driven by the drag link 1, the swing link 2 swings around the hinging joint at which the swing link 2 is hinged to the bottom plate 3, so as to drive the carrier plate 8 on which the PCB is installed to move downward, to enable the PCB to be installed into the backplane to complete plugging of the PCB.

An unplugging process of the PCB is on the contrary. The drag link 1 moves outward. The locking rod 13 receives tension from the boss of the drag link 1. When the drag link 1 is pulled out to a certain position, the hook end 15 is in contact with the inner end 17 of the boss. Under a reset action of the elastic apparatus 14, the hook end 15 is immediately snap-fitted with the inner end 17 of the boss, so that the drag link 1 cannot randomly move. In a process of moving outward, the drag link 1 drives the swing link 2 to swing, so as to enable the carrier plate 8 to move upward to unplug the PCB upward from the backplane. Because the hook end 15 is snap-fitted with the inner end 17 of the boss, the carrier plate 8 on which the PCB 9 is installed cannot freely slide off in a process of moving from inward to outward.

Preferably, as shown in FIG. 5, one end of the elastic apparatus 14 is fastened on the hook end 15 of the locking rod 13, and the other end of the elastic apparatus 14 is fastened on the bottom plate 3.

Further, the elastic apparatus 14 is an elastic sheet or a clamping spring. The other end of the elastic apparatus 14 passes through a convex hull 18 provided on the bottom plate 3 and is fastened.

Preferably, the PCB 9 is a PCI express card.

Figure 6:
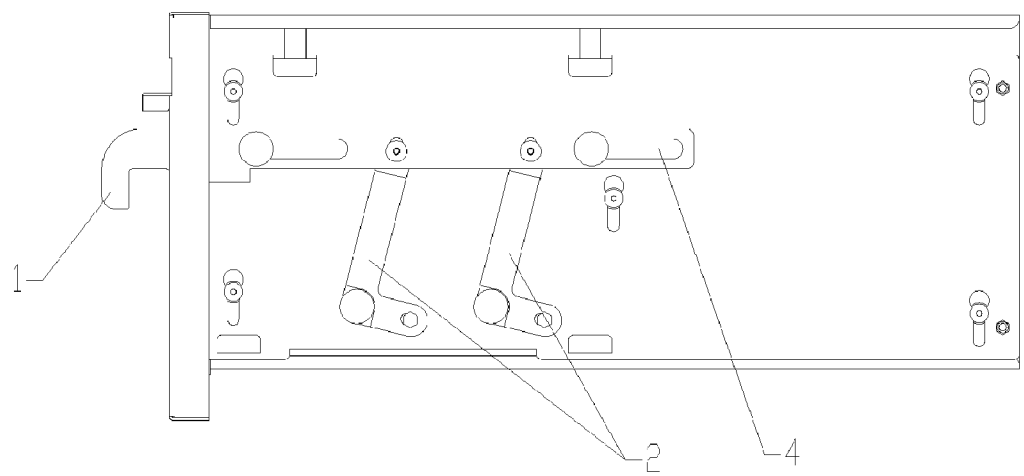
FIG. 6 is a schematic diagram of a linkage apparatus according to a second implementation manner of the present disclosure.

A second implementation manner of the present disclosure is shown in FIG. 6. A difference from the first implementation manner is that the drag link 1 drives two or more swing links 2 to move. The swing links 2 are located on the same side of the horizontal guide groove 4. For other implementation details, reference may be made to the first embodiment and the preferred or optional solutions described in the first embodiment, which are not further described herein.

Figure 7:
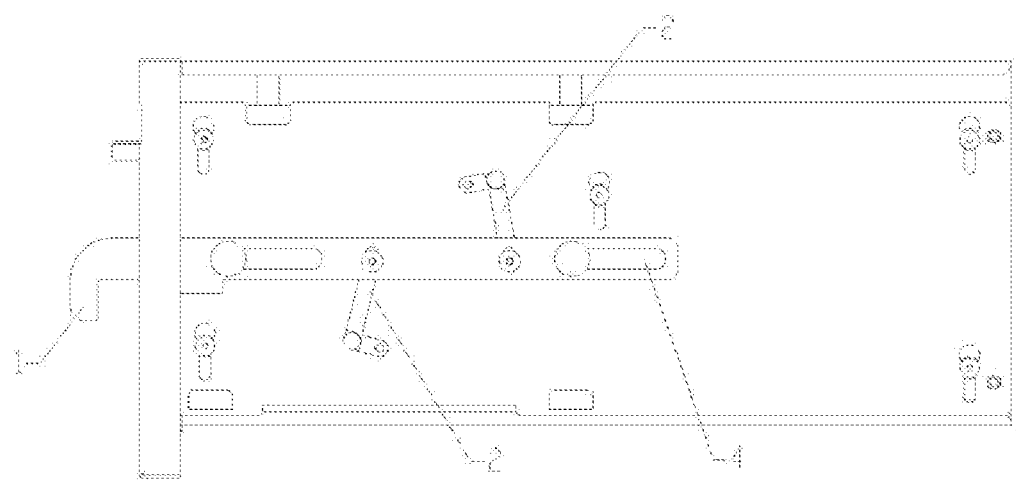
FIG. 7 is a schematic diagram of a linkage apparatus according to a third implementation manner of the present disclosure.

A third implementation manner of the present disclosure is similar to the second implementation manner. As shown in FIG. 7, a difference is that two swing links 2 shown in FIG. 6 are located on up and down sides of the horizontal guide groove 4.

In a fourth implementation manner of the present disclosure, the horizontal guide groove 4 is provided on the bottom plate 3 instead of being provided on the drag link 1 and the corresponding first fixing pin 6 is disposed on the drag link 1 instead of being disposed on the bottom plate 3. For other implementation details, reference may be made to other embodiments of the present disclosure and the preferred or optional solutions described in the other embodiments, which are not further described herein.

In a fifth implementation manner of the present disclosure, the fixing hole 5 is provided on the carrier plate 8 instead of being provided on the second end of the swing link 2, and the corresponding second fixing pin 10 is disposed on the second end of the swing link 2 instead of being disposed on the carrier plate 8. For other implementation details, reference may be made to other embodiments of the present disclosure and the preferred or optional solutions described in the other embodiments, which are not further described herein.

The corresponding fourth and fifth implementation manners may also have the following similar transformations. There are multiple swing links 2, and the swing links 2 are located on the same side or two sides of the horizontal guide groove 4.

It can be seen that, according to the linkage apparatus for plugging a PCB provided in the embodiments of the present disclosure, a swing link is driven by a drag link, so that a carrier plate can be driven to vertically move. In this way, hot plugging of a PCI express card fastened on the carrier plate and plugging of another PCB that requires two-dimensional plugging can be implemented by pushing and pulling the drag link without interrupting a power supply. The linkage apparatus used in the embodiments of the present disclosure has a simple structure, is reliable, and has good operability.

Accordingly, an embodiment of the present disclosure further provides a finished board 22. Referring to FIG. 4, the finished board includes a bottom plate 3, a carrier plate 8, a PCB 9 fastened on the carrier plate, and the foregoing linkage apparatus for plugging a PCB.

Figure 8:
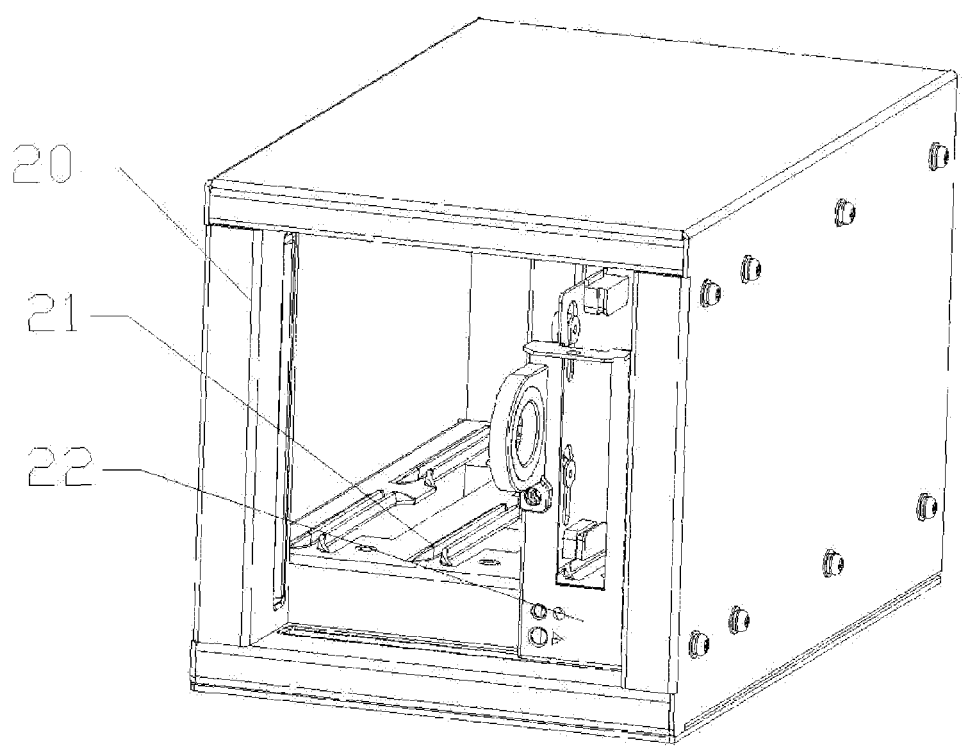
FIG. 8 is a schematic diagram of a subrack according to the present disclosure.

Accordingly, an embodiment of the present disclosure further provides a subrack 20 for plug-connecting a finished board, as shown in FIG. 8, including a guide rail 21, where the finished board 22 is the foregoing finished board 22, and the guide rail 21 matches a bottom of the finished board 22 and is configured to install or remove the finished board 22 in a sliding manner.

It can be seen that, according to the finished board and the subrack for plug-connecting a finished board provided in the embodiments of the present disclosure, a linkage apparatus uses the linkage apparatus provided in the embodiments of the present disclosure, and a swing link is driven by a drag link, so that a carrier plate can be driven to vertically move. In this way, hot plugging of a PCI express card fastened on the carrier plate and plugging of another PCB that requires two-dimensional plugging can be implemented by pushing and pulling the drag link without interrupting a power supply.

In addition, the finished board having the foregoing linkage apparatus that can implement two-dimensional plugging can further be applied to a horizontal subrack in a scenario in which a backplane is vertically installed. Moreover, the finished board can further be applied in a scenario in which the backplane is disposed in a middle and horizontal position and the finished boards having the foregoing linkage apparatus are plugged in an up-and-down manner or plugged in a front and back manner. The foregoing are exemplary implementation manners of the present disclosure. It should be noted by a person of ordinary skill in the art that several improvements and modifications may be further made without departing from the principle of the present disclosure and these improvements and modifications shall also be construed as falling within the protection scope of the present disclosure.

What is claimed is:

1. A linkage apparatus for plugging a printed circuit board (PCB), comprising:
   a drag link; and
   a swing link,
   wherein the linkage apparatus is disposed between a bottom plate and a carrier plate,
   wherein the carrier plate is configured to fasten the PCB, and the bottom plate, the carrier plate, and the PCB are parallel to one another,
   wherein the drag link is rotatably connected to the swing link, the drag link and the bottom plate are connected to a first fixing pin by using a horizontal guide groove, the first fixing pin is configured to move in the horizontal guide groove, an outward-extending end of the drag link forms a handle, and the handle can push and pull the drag link to move inward or outward,
   wherein the swing link is in an "L" shape, a first end is rotatably connected to the drag link, a corner in the middle is rotatably connected to the bottom plate, and a second end is fastened to the carrier plate,
   wherein a third fixing pin connects the bottom plate and the carrier plate, a vertical guide groove is provided on the carrier plate, and the third fixing pin is configured to move in the vertical guide groove, and
   wherein the horizontal guide groove is opened on the drag link and the first fixing pin is disposed on the bottom plate.

2. The linkage apparatus for plugging the PCB according to claim 1, wherein the linkage apparatus further comprises a locking mechanism for preventing the carrier plate from freely sliding off during plugging.

3. The linkage apparatus for plugging the PCB according to claim 1, wherein the linkage apparatus comprises two or more than two third fixing pins, wherein the two or more than two third fixing pins comprise the first fixing pin that connects the drag link and the bottom plate, and wherein each of the third fixing pins is disposed in a corresponding different vertical guide groove.

4. The linkage apparatus for plugging the PCB according to claim 1, wherein the PCB comprises a peripheral component interconnect (PCI) express card.

5. The linkage apparatus for plugging the PCB according to claim 1, wherein a fixing hole is provided on the carrier plate, a second fixing pin is disposed on the second end of the swing link, and the second fixing pin passes through the fixing hole to fasten the swing link and the carrier plate.

6. The linkage apparatus for plugging the PCB according to claim 1, wherein a fixing hole is provided on the second end of the swing link, a second fixing pin is disposed on the carrier plate, and the second fixing pin passes through the fixing hole to fasten the swing link and the carrier plate.

7. The linkage apparatus for plugging the PCB according to claim 1, wherein the linkage apparatus comprises multiple swing links, and the multiple swing links are located on the same side or on two sides of the horizontal guide groove.

8. A linkage apparatus for lugging a printed circuit board (PCB), comprising:
   a drag link; and
   a swing link,
   wherein the linkage apparatus is disposed between a bottom plate and a carrier plate,
   wherein the carrier plate is configured to fasten the PCB, and the bottom plate, the carrier plate, and the PCB are parallel to one another,
   wherein the drag link is rotatably connected to the swing link, the drag link and the bottom plate are connected to a first fixing pin by using a horizontal guide groove, the first fixing pin is configured to move in the horizontal guide groove, an outward-extending end of the drag link forms a handle and the handle can push and pull the drag link to move inward or outward,
   wherein the swing link is in an "L" shape, a first end is rotatably connected to the drag link, a corner in the middle is rotatably connected to the bottom plate, and a second end is fastened to the carrier plate,
   wherein a third fixing pin connects the bottom plate and the carrier plate, a vertical guide groove is provided on the carrier plate, and the third fixing pin is configured to move in the vertical guide grove,
   wherein the linkage apparatus further comprises a locking mechanism for preventing the carrier plate from freely sliding off during plugging,
   wherein the locking mechanism is disposed below the drag link and comprises a locking rod and an elastic apparatus configured to reset the locking rod,
   wherein the locking rod comprises a first side, a second side, and a third side that are connected in a top-down sequence, wherein one end of the first side is free and forms a hook end in a hook shape, the other end of the first side is connected to a first end of the second side and is hinged to the bottom plate at a joint, a second end of the second side is connected to one end of the third side, the other end of the third side is a free end, and both the first side and the second side, and the second side and the third side are connected by forming a certain angle, and wherein a boss is downward projected from the drag link, an inner end of the boss is snap-fitted with the hook end of the locking rod at a pull-out position of the drag link, and the free end of the locking rod is in contact with stowage and is stressed when the stowage is loaded on the bottom plate and the carrier plate.

9. The linkage apparatus for plugging the PCB according to claim 8, wherein one end of the elastic apparatus is fastened to the hook end of the locking rod, and the other end of the elastic apparatus is fastened to the bottom plate.

10. The linkage apparatus for plugging the PCB according to claim 9, wherein the other end of the elastic apparatus passes through a convex hull provided on the bottom plate and is fastened.

11. The linkage apparatus for plugging the PCB according to claim 8, wherein the elastic apparatus is an elastic sheet or a clamping spring.

12. A linkage apparatus for plugging a printed circuit board (PCB), comprising:
a drag link; and
a swing link,
wherein the linkage apparatus is disposed between a bottom plate and a carrier plate,
wherein the carrier plate is configured to fasten the PCB, and the bottom plate, the carrier plate, and the PCB are parallel to one another,
wherein the drag link is rotatably connected to the swing link, the drag link and the bottom plate are connected to a first fixing pin by using a horizontal guide groove, the first fixing pin is configured to move in the horizontal guide groove, an outward-extending end of the drag link forms a handle, and the handle can push and pull the drag link to move inward or outward,
wherein the swing link is in an "L" shape, a first end is rotatably connected to the drag link, a corner in the middle is rotatably connected to the bottom plate, and a second end is fastened to the carrier plate,
wherein a third fixing pin connects the bottom plate and the carrier plate, a vertical guide groove is provided on the carrier plate, and the third fixing pin is configured to move in the vertical guide groove, and
wherein the two horizontal guide grooves between which a certain interval exists are opened on the drag link, and a corresponding first fixing pin that is configured to move in the horizontal guide groove is disposed in each of the horizontal guide grooves.

13. The linkage apparatus for plugging the PCB according to claim 12, wherein the horizontal guide groove is opened on the bottom plate and the first fixing pin is disposed on the drag link.

14. The linkage apparatus for plugging the PCB according to claim 12, wherein the horizontal guide groove is opened on the drag link and the first fixing pin is disposed on the bottom plate.

15. A finished board, comprising
a bottom plate;
a carrier plate;
a printed circuit board (PCB) fastened on the carrier plate; and
a linkage apparatus for plugging the PCB,
wherein the linkage apparatus is disposed between the bottom plate and the carrier plate,
wherein the carrier plate is configured to fasten the PCB, and the bottom plate, the carrier plate, and the PCB are parallel to one another,
wherein the linkage apparatus comprises a drag link and a swing link,
wherein the drag link is rotatably connected to the swing link, the drag link and the bottom plate are connected to a first fixing pin by using a horizontal guide groove, the first fixing pin is configured to move in the horizontal guide groove, an outward-extending end of the drag link forms a handle, and the handle can push and pull the drag link to move inward or outward,
wherein the swing link comprises an "L" shape, a first end is rotatably connected to the drag link, a corner in the middle is rotatably connected to the bottom plate, and a second end is fastened to the carrier plate,
wherein a third fixing pin connects the bottom plate and the carrier plate, a vertical guide groove is provided on the carrier plate, and the third fixing pin is configured to move in the vertical guide groove,
wherein the linkage apparatus further comprises a locking mechanism for preventing the carrier plate from freely sliding off during plugging,
wherein the locking mechanism is disposed below the drag link and comprises a locking rod and an elastic apparatus configured to reset the locking rod,
wherein the locking rod comprises a first side, a second side, and a third side that are connected in a top-down sequence,
wherein one end of the first side is free and forms a hook end in a hook shape, the other end of the first side is connected to a first end of the second side and is hinged to the bottom plate at a joint, a second end of the second side is connected to one end of the third side, the other end of the third side is a free end, and both the first side and the second side, and the second side and the third side are connected by forming a certain angle, and
wherein a boss is downward projected from the drag link, an inner end of the boss is snap-fitted with the hook end of the locking rod at a pull-out position of the drag link, and the free end of the locking rod is in contact with stowage and is stressed when the stowage is loaded on the bottom plate and the carrier plate.

16. The finished board according to claim 15, wherein one end of the elastic apparatus is fastened to the hook end of the locking rod, and the other end of the elastic apparatus is fastened to the bottom plate.

* * * * *